J. G. DENIS.
FRUIT OR VEGETABLE CUTTER.
APPLICATION FILED DEC. 21, 1914.
1,142,681.
Patented June 8, 1915.
2 SHEETS—SHEET 1.
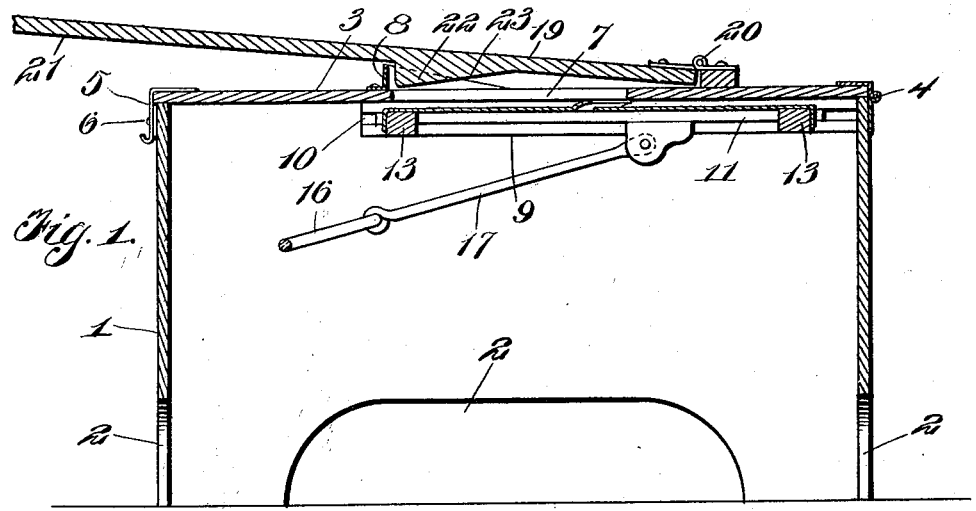
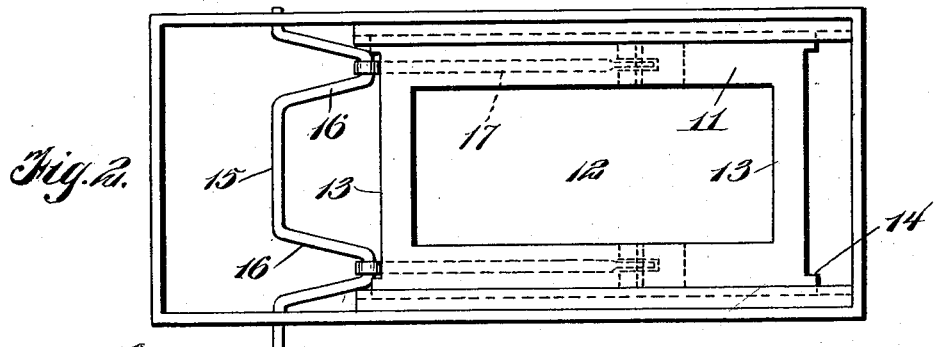
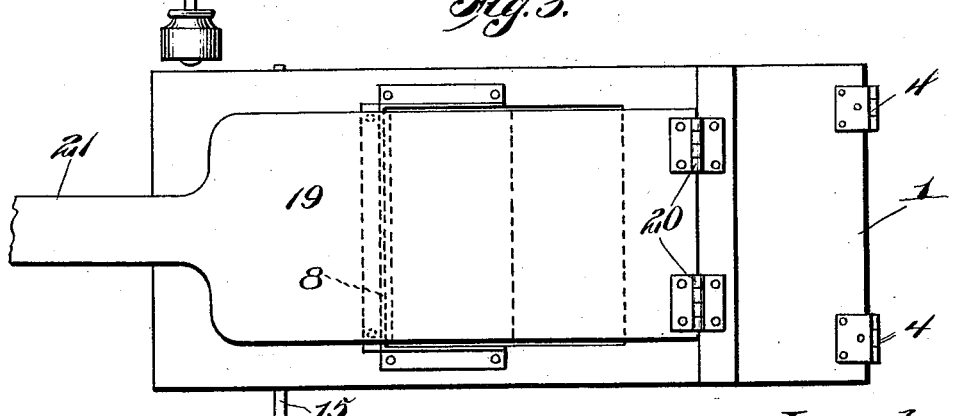
Witnesses:
L. R. Heinrichs
Eva W. Springer
Inventor:
John G. Denis,
By C. C. Hines,
Atty.

J. G. DENIS.
FRUIT OR VEGETABLE CUTTER.
APPLICATION FILED DEC. 21, 1914.
1,142,681.
Patented June 8, 1915.
2 SHEETS—SHEET 2.
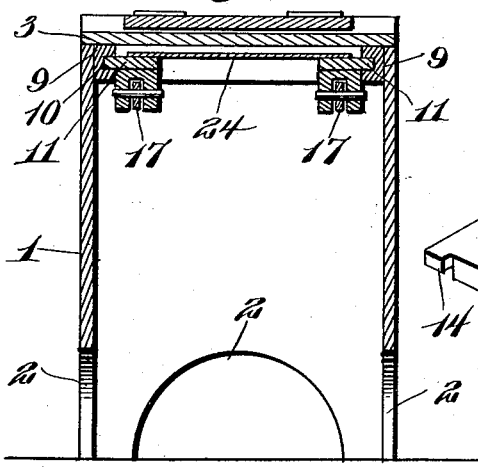
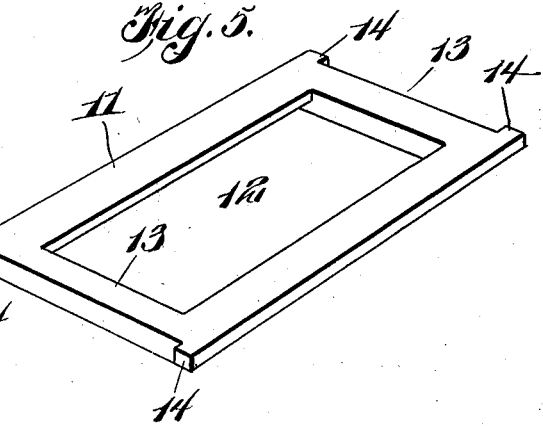
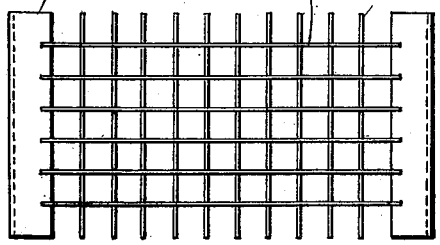
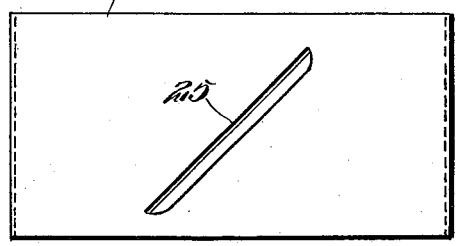
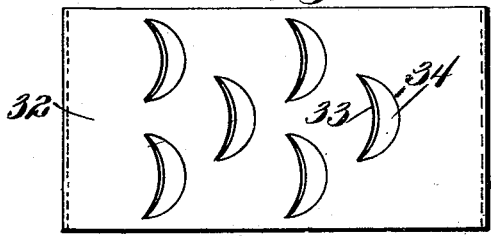
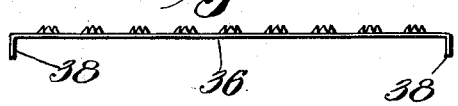
Witnesses:
J. R. Heinrichs
Eva W. Springer
Inventor:
John G. Denis,
By C. C. Hines,
Atty.

UNITED STATES PATENT OFFICE.

JOHN G. DENIS, OF NEW ORLEANS, LOUISIANA.

FRUIT OR VEGETABLE CUTTER.

1,142,681.  Specification of Letters Patent.  Patented June 8, 1915.

Application filed December 21, 1914. Serial No. 878,388.

*To all whom it may concern:*

Be it known that I, JOHN G. DENIS, a citizen of the United States, residing at New Orleans, in the parish of Orleans and State of Louisiana, have invented new and useful Improvements in Fruit or Vegetable Cutters, of which the following is a specification.

My invention relates to a machine or device for use in cutting, grating, peeling and slicing fruits or vegetables, such as apples, potatoes, cabbages and the like, and its object is to provide a device of this character which is simple and inexpensive of construction, convenient and efficient in operation, and readily adapted for various operations of the character specified.

The invention consists in the features of construction, combination, and arrangement of parts hereinafter described and claimed, reference being had to the accompanying drawings, in which:

Figure 1 is a vertical longitudinal section through a fruit or vegetable cutter, slicer and peeler constructed in accordance with my invention; Fig. 2 is a bottom plan view of the same; Fig. 3 is a top plan view of the machine; Fig. 4 is a vertical transverse section thereof; Fig. 5 is a perspective view of the reciprocating carrier plate; Fig. 6 is a top plan view of one form of die or cutter plate; Fig. 7 is a vertical longitudinal section of the same; Fig. 8 is a top plan view of another form of die or cutter plate; Fig. 9 is a vertical longitudinal section of the same; Fig. 10 is a top plan view of still another form of die or cutter plate; Fig. 11 is a vertical longitudinal section of the same; and Fig. 12 is a side elevation of still another form of die.

The device comprises an oblong rectangular box-like frame or casing 1 open at the bottom and top, and the side and end walls of which may be provided with openings 2 to form supporting feet at the corners thereof, as well as to provide passages through which a vessel to receive the cuttings or peelings may be introduced and removed. The top of the said frame or casing is adapted to be closed by a lid or cover 3 hinged at one end thereof, as shown at 4, and provided at its opposite end with a spring clasp 5 to engage a keeper stud 6, whereby said lid or cover may be normally held in an operative position. The lid or cover is provided with an opening 7 of rectangular form for the passage of the fruit or vegetable to be acted upon, and at its rear end and the adjacent portion of its sides the opening is provided with a curb, abutment or guard plate 8. This abutment or guard plate is U-shaped and has the walls of its side portions inclined downwardly and forwardly, for a purpose hereinafter specified, the function of said abutment or guard being to retain and prevent the fruit or vegetable from becoming displaced while it is being treated or acted upon.

Arranged upon the side walls of the frame or casing below the top edges thereof are guide members 9 provided with grooved guideways 10 to receive the longitudinal side edges of an oblong rectangular carrier plate 11. This plate is provided with a central longitudinal opening 12, of the same width but of greater length than the opening 7, for the passage of the cuttings or peelings from the fruit or vegetable acted upon. At its ends the plate is cut away to provide inset edges 13 and projecting corner shoulders 14. Journaled in the side walls of the frame or casing is an operating shaft 15 having a pair of cranks 16, and pivotally coupling said cranks to the carrier plate 11 are pitman or connecting rods 17, whereby when the shaft is revolved the carrier plate will be longitudinally reciprocated. One end of the shaft 15 projects exteriorly and is provided with a suitable operating crank handle 18.

The device may be employed for various cutting, slicing, grating, peeling and other operations, in the carrying out of which various styles or constructions of dies are used and which are interchangeable for use and connection with the reciprocating carrier plate. For use in holding the fruit or vegetable in position while it is being acted upon, or forcing it downward through or into engagement with the die held by the reciprocating carrier plate, I provide a pressure lever or force feed device 19 hinged or pivoted at its forward end to the lid 3 in advance of the opening 7, as shown at 20, and having a rearwardly projecting handle 21. This lever is in the form of a plate adapted to extend longitudinally over the opening 7 and substantially coextensive therewith. The under side of the pressure plate or lever is provided with a transversely disposed pressure block 22, which is adapted to go down within the guard 8 when said plate or lever is at the limit of its downward movement, as shown in Fig. 1, said block 22 having a downwardly and rearwardly inclined abutment surface 23 to hold the fruit or vegetable against rearward slipping, while giving it a positive force feed pressure as the lever is moved downward for the force feed action. It is evident that after the fruit or vegetable is fitted in the opening 7 for treatment the operator may conveniently manipulate the machine, employing one hand to operate the driving shaft and the other hand to operate the force feed device or lever.

In Figs. 6 and 7 I have shown one form of die or cutter plate for use in connection with the machine, the said die or cutter plate 24 being adapted to rest upon the carrier plate 11 and provided with a diagonal slot 25 and a cutter blade 26, whereby a certain slicing action may be performed. This blade is provided at its ends with down turned gripping flanges 27 which are adapted to engage the end edges 13 of the reciprocating carrier plate 11 and to be retained against lateral movement by the shoulders 14, whereby the die is held against displacement.

In Figs. 8 and 9 I have shown another form of die or cutter 28 having longitudinal and transverse blades 29 and 30, forming square cells or pockets for the downward passage of the portions of fruit or vegetable. This die is provided with gripping flanges 31 similar to the flanges 27. The die 34 when in use is reciprocated with the carrier plate, while the die 28 when in use is fitted upon the carrier plate or clamped in position between said plate and the lid or cover 3 and held stationary with the carrier plate while the force feed lever is moved downward to force the fruit or vegetable against the cutters 29 and 30 and through the cells of the die, by means of which the fruit or vegetable will be severed into blocks or strips.

In Figs. 10 and 11 I have shown another form of die or cutter plate 32 which is similar to the die 24 except that it is provided with a plurality of crescent shaped slots 33 and cutters 34 for severing the fruit or vegetable in a specified way, the said die being also provided with gripping flanges 35 similar to the flanges 27 and 31.

In Fig. 12 I have shown a die 36 consisting of a blade, like the plates 24 and 32, but having punched up therefrom spurs or teeth 37 which provide discharge openings, which die is adapted to serve for peeling and grating purposes and is provided with gripping flanges 38 similar to the flanges 27, 31 and 35.

From the foregoing description, taken in connection with the drawings, it will be seen that the invention provides a fruit or vegetable cutter, grater, peeler and slicer which is simple of construction, and which may be readily kept clean and manipulated, and which is adapted to receive interchangeable dies whereby various operations of the character set forth may be easily, conveniently and expeditiously carried out. Other advantages will be apparent to those versed in the art from the foregoing description.

Having thus described my invention, I claim:

A device of the character described including a frame or casing having an opening in the top thereof, a feed opening therein, a carrier plate disposed beneath the feed opening, said plate having a discharge slot and having cut away portions forming engaging ends and corner shoulders, and a die adapted to rest upon said plate and having depending gripping flanges to engage said abutment ends of the carrier plate and to lie between said shoulders.

In testimony whereof I affix my signature in presence of two witnesses.

JOHN G. DENIS.

Witnesses:
J. P. BALDWIN,
D. KAUFFMAN.

Copies of this patent may be obtained for five cents each, by addressing the "Commissioner of Patents, Washington, D. C."